No. 618,654. Patented Jan. 31, 1899.
G. W. FAUNCE.
BICYCLE SUPPORT AND LOCK.
(Application filed Apr. 5, 1898.)
(No Model.)
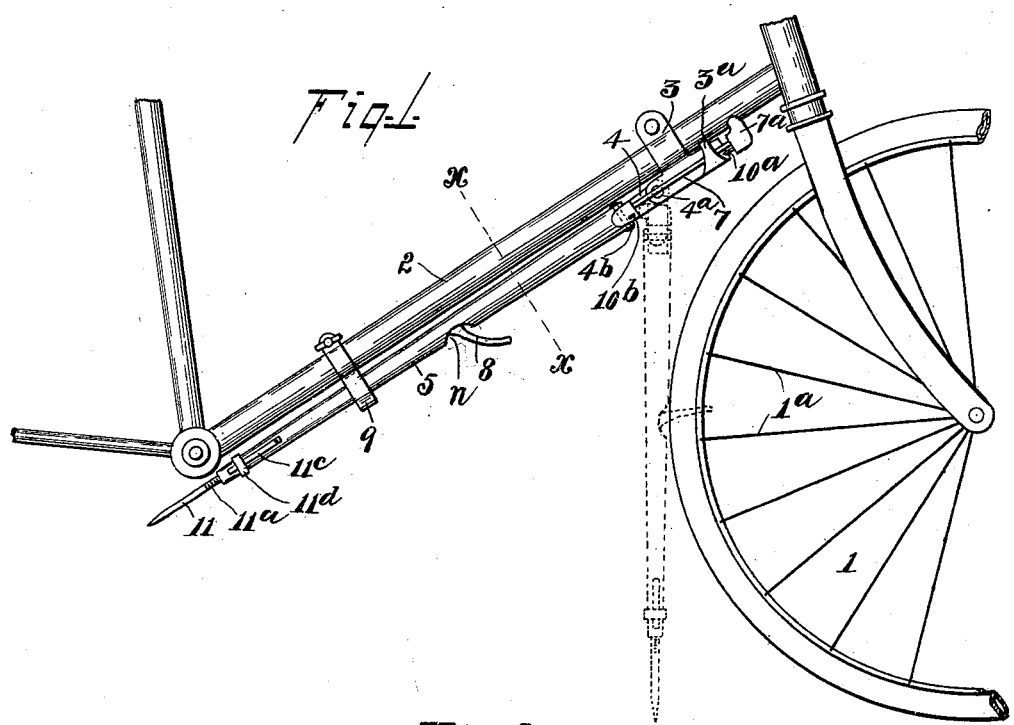
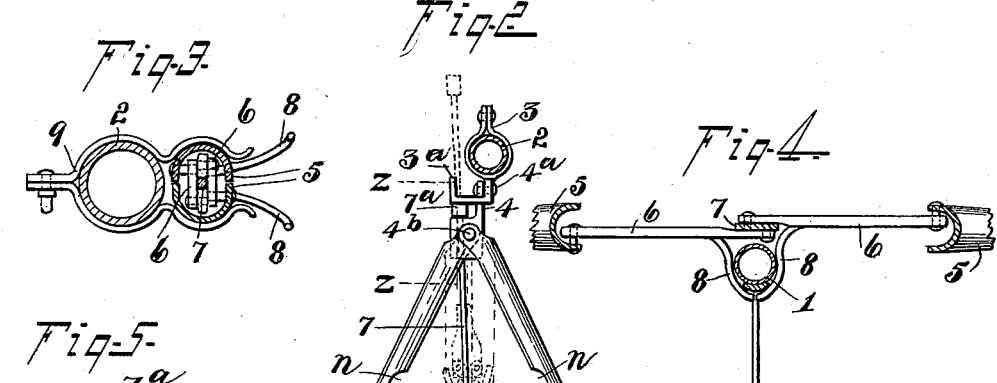
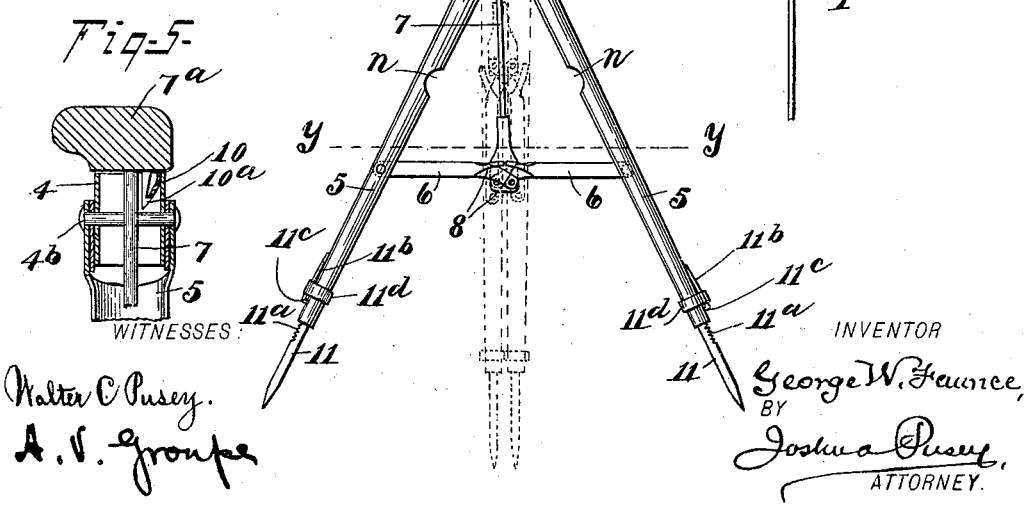
WITNESSES:
Walter C. Pusey.
A. V. Groupe
INVENTOR
George W. Faunce,
BY
Joshua Pusey,
ATTORNEY.

UNITED STATES PATENT OFFICE.

GEORGE W. FAUNCE, OF PHILADELPHIA, PENNSYLVANIA, ASSIGNOR OF ONE-HALF TO FREDERICK SEITTER, OF SAME PLACE.

BICYCLE SUPPORT AND LOCK.

SPECIFICATION forming part of Letters Patent No. 618,654, dated January 31, 1899.

Application filed April 5, 1898. Serial No. 676,506. (No model.)

*To all whom it may concern:*

Be it known that I, GEORGE W. FAUNCE, a citizen of the United States, residing in the city and county of Philadelphia, State of Pennsylvania, have invented certain new and useful Improvements in Bicycle Supports and Locks, of which the following is a full, clear, and exact description, reference being had to the accompanying drawings, of which—

Figure 1 is a side elevation of the invention applied to a bicycle in the closed position; Fig. 2, a front elevation of the device opened out as in use, the bicycle-wheel being omitted; Fig. 3, a section on line $x\,x$, Fig. 1; Fig. 4, a section on line $y\,y$, Fig. 2, but showing also the bicycle-wheel in position; Fig. 5, a section, enlarged, on line $z\,z$, Fig. 2.

The object of this invention is to provide a device for supporting and, if desired, at the same time locking a bicycle when at rest which shall be simple, light, strong, and convenient and that may be readily applied to ordinary safety-bicycles.

With this object in view the invention consists in the novel construction and combination of parts, all as hereinafter described, and pointed out in the appended claims.

Referring to the accompanying drawings, which constitute a part of this specification, 1 is the front wheel of a safety-bicycle; 2, the inclined cross-bar of the frame, that extends from the steering-head to the pedal-shaft box. To the upper part of this bar, or, rather, in the present instance to a suitable clip 3, secured thereto, is pivoted on a pin $4^a$ the upper end of a block 4, to which are pivoted on a pin $4^b$ the upper ends of two legs 5, whose length is such that when opened out to constitute a support, as hereinafter described, their lower ends will extend to or beyond the plane of the lower side of the bicycle-wheels when in the vertical position.

The pin $4^a$ is transverse to and the pin $4^b$ parallel with the frame-bar 2, whereby the legs may be swung to and fro with relation to the wheel 1 and also opened out and closed together when required.

To the inner sides of the legs 5 below their junction are pivoted brace-bars 6, which are also pivotally connected. In the present instance they are pivoted to the lower end of a rod 7, that extends up between and projects beyond the junction of the legs. The upper end of this rod has a head or projection $7^a$ for convenience in manipulating the rod, for the purpose hereinafter explained.

Each of the brace-bars 6 has secured thereto on its forward side a curvilinear finger 8. These fingers stand open when the support is folded up when not in use, as seen in Figs. 1 and 3 and indicated in dotted lines in Fig. 2; but when the device is brought into the open or supporting position said fingers will assume substantially a horizontal position and their free ends directed inwardly toward each other, as in Figs. 2 and 4 and indicated by dotted lines in Fig. 1, as and for a purpose to be hereinafter described.

The legs 5 are preferably guttered or approximately semicircular in cross-section, their concavity being in the inner side, as shown.

Having now described the main or important features of construction, I shall proceed to describe the mode of operation of my invention, as follows: Normally when the device is not in actual use the legs are closed together, thus forming a tube or sheath. They are then swung upon the pivot $4^a$ and brought into position to lie close to the under side of the frame-bar 2, in which position they are retained by suitable means—as, for example, by a spring-clip 9 of usual form—all as seen in Fig. 1. When the legs are thus closed together, the brace-bars 6 and part of rod 7 will be inclosed within the tubular sheath formed by the two guttered legs, the fingers 8 projecting forward and standing open, their concave sides being upward, as seen in Figs. 1 and 3.

In order that the part of the fingers adjacent to the legs shall not interfere with the closing of the latter, I cut out suitable notches $n$ in the inner sides of the legs.

When it is desired to support and lock the bicycle, the legs are released from the clip 9 and are then swung down, as indicated by dotted lines in Fig. 2, in back of the bicycle-wheel 1 and are brought into position for their open fingers 8 to pass over and take in the tire and rim of the wheel, the wheel being first, if necessary, sufficiently raised from the ground. The legs are then separated to their full extent, which may be done by pressing down the rod 7 or by simply drawing them apart, whereupon the fingers will assume the position seen in Fig. 4—that is to say, they will embrace the tire and rim—and if they are of sufficient length, which is preferable, as shown in said Fig. 4 and indicated by the dotted lines in Fig. 1, their free ends will pass beyond the line of the spokes $1^a$ of the wheel, and thus prevent the latter from turning without requiring the fingers to tightly embrace the tire. In this way not only is the wheel locked, but the supporting device is maintained in the proper or vertical position.

It is sometimes desirable that the device shall be locked when it is in this position—that is, so that the legs cannot be closed together without unlocking them. To this end I make the block 4, to which the legs are pivoted, hollow (see Fig. 5) and secure on the inner side thereof an inwardly-projecting flat spring-pawl 10, and on the under side of the head $7^a$ on the upper end of the rod 7 I provide a hook or catch $10^a$. When the rod is depressed to open the legs, this catch first pushes aside spring 10, and then the latter springs back and engages the catch, as in Fig. 5, thus locking the rod, and consequently the legs. The rod may be released by pushing back pawl 10, which may be done by means of a suitable key entered into a slot $10^b$, Fig. 1, in block 4.

Other means for locking the legs when in the open position may be employed. For example, a lock may be applied to the brace-bars.

As it is sometimes desirable to have the length or reach of the legs adjustable, I make the free ends thereof tubular for a certain distance and insert therein a slidable pin 11, preferably more or less pointed, as shown, and provide means for in and out adjustment thereof—such, for example, as that shown in the drawings. This consists of ratchet-teeth $11^a$ on the pin in connection with a spring-pawl $11^b$, one end of which is secured to the leg and has a tooth $11^c$ at its free end, that enters an opening in the side of the leg, whereby it (the tooth) is adapted to engage one of the said teeth, the tooth $11^c$ being held normally in such engagement by means of a slidable ring $11^d$ upon the leg.

It will be observed that my supporting and locking device may be readily attached to the bicycles in most general use without requiring any change whatever in the latter. I remark that although usually desirable the rod 7 for operating the brace-bars may be dispensed with. When, however, the rod is used, I sometimes, in order to prevent rattling, provide the part or clip 3 with a projection $3^a$, Figs. 1 and 2, behind which and in close contact therewith the upper end of the rod passes, as shown in Fig. 1.

Having thus described my invention, I claim as new and desire to secure by Letters Patent—

1. In a bicycle lock and support, the combination of an attachment device or clip adapted to be secured to the lower bar or reach of the frame, the legs pivotally secured at their upper ends to the said attachment device or clip, the pivoted braces which connect said legs at their intermediate portions and which when in use are adjacent to the rear portion of the front wheel of the bicycle, and the forwardly-extending fingers secured to said brace-bars and adapted to engage the rim of said wheel, substantially as specified.

2. In a bicycle lock and support, the combination of an attachment device or clip, a block pivoted thereto, a pair of legs pivotally connected to said block, a pair of braces pivotally connected to said legs and to each other, curved forwardly-extending spring-fingers carried by said brace-bars and designed to engage the rim portion of the front wheel, the rod connected to said brace-bars, and means for locking said rod to the said block, substantially as specified.

3. In a bicycle supporting and locking device, the combination of the guttered or semi-tubular legs, pivotally connected at their upper ends and pivoted to the bar of the bicycle-frame, said legs being also notched upon their inner edges, the pivoted brace-bars connecting said legs, the locking-fingers upon said bars, respectively, the rod having its lower end pivoted to said brace-bars, a suitable catch, or lock, for locking said legs when in the open or wheel-locking position, and means for supporting the lower ends of the legs to the bicycle-frame bar when in the closed position, substantially as and for the purpose described.

In testimony whereof I have hereunto affixed my signature this 24th day of March, A. D. 1898.

GEORGE W. FAUNCE.

Witnesses:
WALTER C. PUSEY,
JOSHUA PUSEY.